United States Patent
Fukuyama et al.

(10) Patent No.: US 7,694,458 B2
(45) Date of Patent: Apr. 13, 2010

(54) VARIABLE AND EFFICIENT SPACE UTILIZATION TYPE CULTIVATION METHOD

(76) Inventors: Toshio Fukuyama, 8-6, Imazaike 2-chome, Matsuyama-city, Ehime (JP) 7911103; Tadashi Ninomiya, 4814-2, Tachiyama, Uchiko-machi, Kita-gun, Ehime (JP) 7913331; Takashi Tsurusaki, 460-29, Kumekubota-chou, Matsuyama-city, Ehime (JP) 7911101; Yoshihiko Fujimoto, 564, Matsunami-chou, Takamatsu-city, Kagawa (JP) 7618052

(*) Notice: Subject to any disclaimer, the term of this patent is extended or adjusted under 35 U.S.C. 154(b) by 0 days.

(21) Appl. No.: 11/792,918

(22) PCT Filed: Dec. 14, 2005

(86) PCT No.: PCT/JP2005/022926

§ 371 (c)(1), (2), (4) Date: Jun. 12, 2008

(87) PCT Pub. No.: WO2006/064828

PCT Pub. Date: Jun. 22, 2006

(65) Prior Publication Data

US 2008/0271373 A1   Nov. 6, 2008

(30) Foreign Application Priority Data

Dec. 14, 2004 (JP) ............................. 2004-362090
Jul. 6, 2005 (JP) ............................. 2005-196911

(51) Int. Cl.
*A01G 9/12* (2006.01)
*A01G 17/08* (2006.01)

(52) U.S. Cl. ............................................ 47/67; 47/46

(58) Field of Classification Search ................. 47/62 A, 47/62 C, 62 N, 24.1, 32.8, 46, 47, 48.5, 67, 47/79, 66.7, 58.1 FV
See application file for complete search history.

(56) References Cited

U.S. PATENT DOCUMENTS 2,862,334 A * 12/1958 Sandvig .......................... 47/47

(Continued)

FOREIGN PATENT DOCUMENTS

EP       429050 A1 *   5/1991

(Continued)

OTHER PUBLICATIONS

Patent Cooperation Treaty (PCT) International Preliminary Report on Patentability, issued on Oct. 25, 2007 in International Application No. PCT/JP2005/022926.

*Primary Examiner*—Son T Nguyen
*Assistant Examiner*—Danielle Bates
(74) *Attorney, Agent, or Firm*—Wenderoth, Lind & Ponack L.L.P.

(57) ABSTRACT

Ecopots having a large number of holes permeable to the culture solution and air are used for disposing seeding and seedling pots or for planting seedlings and are hung in the space in a house, a bucket for collecting the drips of the culture solution is placed below each pot for collecting the residual solution to thereby prevent the infection by pathogens, and a balancing toy-like hanger hung vertically from a hook hung movably from a shelf pole in the house via a loop clutch, an ecopot hanging chain, a main melon stem attracting cord, a melon fruit hanging cord and so forth are used to render the ecopot hung from the ecopot hanging chain orientation-variable in all directions so that oxygen may be fed abundantly to the rooting zone of the horticultural plant and the plant may receive the sunshine with ease.

1 Claim, 2 Drawing Sheets

U.S. PATENT DOCUMENTS

| | | | | |
|---|---|---|---|---|
| 3,300,895 A | * | 1/1967 | Dosedla et al. | 47/62 C |
| 3,518,791 A | * | 7/1970 | Carson et al. | 47/47 |
| 3,930,334 A | * | 1/1976 | Johnston | 47/67 |
| 4,034,508 A | * | 7/1977 | Dedolph | 47/84 |
| 4,446,653 A | * | 5/1984 | Morgan, Jr. | 47/67 |
| 5,052,149 A | * | 10/1991 | Johnson | 47/67 |
| 5,062,239 A | * | 11/1991 | Helton | 47/79 |

FOREIGN PATENT DOCUMENTS

| | | | |
|---|---|---|---|
| JP | 55-100283 | | 7/1980 |
| JP | 58-205435 | | 11/1983 |
| JP | 58205435 A | * | 11/1983 |
| JP | 63-49027 | | 3/1988 |
| JP | 03292820 A | * | 12/1991 |
| JP | 05319474 A | * | 12/1993 |
| JP | 07203776 A | * | 8/1995 |
| JP | 07327514 A | * | 12/1995 |
| JP | 2000-014250 | | 1/2000 |
| JP | 2000014250 A | * | 1/2000 |
| JP | 2000-139233 | | 5/2000 |
| JP | 2002-253045 | | 9/2002 |
| JP | 2002-305987 | | 10/2002 |
| JP | 2004-49044 | | 2/2004 |
| JP | 2004049044 A | * | 2/2004 |
| JP | 2004-305085 | | 11/2004 |

* cited by examiner

VARIABLE AND EFFICIENT SPACE UTILIZATION TYPE CULTIVATION METHOD

TECHNICAL FIELD

The present invention relates to a cultivation system which makes it easy to feed oxygen, water and nutrients to the rooting zone of a horticultural species and vary the direction or orientation of light interception by plants under cultivation and of the stems and leaves thereof to thereby cause the plants to receive the sunshine efficiently, hence grow well, leading to improved growth of stems, leaves and fruits and, further, makes it possible to carry out control and other works in the standing and facing position to render the works much easier and improve the efficiency and according to which the cultivation materials and so forth can be utilized as regenerated medium.

BACKGROUND ART

The cultivation of melon and strawberry, which are well known as protected horticulture products, is generally carried out by direct seeding or planting of seedlings into a cultivation bed (rooting zone medium) as in the cultivation device or cultivation method described in Japanese Kokai (Laid-open) Publication H07-327514 or Japanese Kokai (Laid-open) Publication H05-227848, and it is known that oxygen is fed to the roots of the plant under cultivation by cultivation soil tillage and/or the period of solar ray irradiation is prolonged as far as possible to thereby promote the growth of stems, leaves and fruits and the maturation of fruits.

In practicing such a cultivation method, the working posture required in cultivating the cultivation soil, which compels a long time of bending forward and maintaining an inefficient position, is nothing but heavy labor. Thus, there is the possibility that lumbago and other health problems due to the bending forward posture during the long time maintenance of working may arise among cultivation workers.

The technique of nutriculture which comprises circulating a culture solution to feed nutrients to the rooting zone of each plant is in use as a method for solving such problems as mentioned above. This cultivation method does not use cultivation soil but causes a culture solution to artificially circulate via artificially made grooves and the roots of plants are planted therein. Nutriculture is thus a cultivation method using no medium in the cultivation bed and, therefore, the orientation of the plant under cultivation can be varied with ease according to the direction of the sunshine, and the systematized equipment for supplementing nutrients and oxygen to the culture solution makes it unnecessary to perform tillage or weeding, and workers are released from the painful bending forward posture. However, there is a problem, namely the possibility of plants being infected by pathogens that have entered into the culture solution circulating to feed water and nutrients to the rooting zone of each plant.

According to the present invention, a culture solution feeding pipe is connected to each porous ecopot for cultivation which is hung in a space below a shelf pole in the house, and the culture solution is thus fed to each ecopot. Thus, measures are taken to prevent infection by pathogens and isolate the ecopots from the source of infection by placing a collecting bucket below each ecopot while feeding water and nutrients and oxygen to the rooting zone of each plant through the culture solution fed to each ecopot via the piping. By employing such a variable and efficient space utilization type cultivation method, the present invention provides a novel cultivation method according to which the orientation of stems, leaves and fruits can be varied freely toward the sunshine to enrich fruits of the plant under cultivation and increase sugar accumulation therein and, at the same time, the standing and facing working posture can be realized and which has the possibility of supplying a large number of high-quality melon or strawberry to the market.

The cultivation bed of the present invention can be expected to be effective, also as a measure for alleviating the above-mentioned problems in nutriculture, in preventing infection by pathogens and isolating plants from the source of infection. An example of melon cultivation is shown in FIG. 1. The method of the present invention is a cultivation method characterized in that the medium is placed in each porous ecopot for cultivation for a long period from good seedling production to field cultivation and harvest and that the cultivation ecopots and seedling pots and other cultivation materials after use are reused as a regenerated medium.

SUMMARY OF INVENTION

The problem to be solved by the present invention is to take measures in particular in feeding water and nutrients and oxygen to the rooting zone and preventing infection by soil pathogens in a method of cultivating horticultural crops. Further, consideration is given to freely move the whole plant to secure an efficient light-intercepting geometry as a measure for securing sufficient solar radiation for the aerial part in the vigorous growing period. Namely, this means the maximum utilization of the solar energy in the period during which the photosynthesis is in progress most vigorously.

The most important feature of the present invention lies in that ecopots having a large number of holes permeable to the culture solution and air are used for placing seedling pots for seeding or for planting seedlings so that oxygen, water and nutrients may be fed abundantly to the rooting zone of each horticultural plant and, at the same time, the orientation of stems and leaves may be varied to make them sufficiently receive the sunshine and that the ecopots are hung in a space in the house and a drip of culture solution collecting bucket is placed below each cultivation ecopot to thereby prevent the other plants from being infected by pathogens and, at the same time, each cultivation ecopot is made variable in every direction for facilitating light-interception by hanging each ecopot in the vertical direction from a shelf pole in the house by means of a balancing toy-like hanger.

It is a characteristic feature of the cultivation method of the present invention that a consistent common cultivation medium is originally produced and used for a long period from good seedling production to field cultivation and harvest.

Thus, the ecopots and other cultivation materials, which are of plant origin, after use are all finely ground, sufficiently sterilized and disinfected with high-temperature steam and supplemented with a culture solution to regenerate a compost for reuse. At the same time, the regenerated medium is supplemented with charred rice husk, bamboo charcoal, bentonite, artificial zeolite and so forth each in a small amount so that the medium may newly show a buffering action or effect and serve as a good medium material for cultivation. This is another characteristic feature of the present invention.

Furthermore, as regards the aerial part control in the present cultivation method, a technology has been developed for most efficiently utilizing the house inside space. Thus, an technology has been developed for adapting the plant to an optimum light-receiving geometry according to the plant species (including the variety etc.) and the stage of growth while taking into consideration the state of growth of the plant and the light, temperature, humidity, $CO_2$ concentration distribution and other conditions resulting from fluctuations in atmospheric conditions from time to time. This consists in considering how to position the pot cultivation plants in the house according to the stage of growth and the cultivation environment. Specifically, the whole plant under cultivation in each pot is geometrically varied freely upward or downward and/or to the left or to the right so that optimum growth adaptability may be obtained according to the growth period and time of cultivation. This is the primary object and greatest characteristic feature of the present cultivation method.

According to the variable and efficient space utilization type cultivation method of the present invention, each porous ecopot having good air permeability is hung by an orientation-variable hanger hung in turn on a shelf pole in the upper part of the house to thereby render the orientation of the seedling ecopot variable after seeding or the orientation of stems and leaves in the ecopot after planting of a seedling, whereby the pot or stems and leaves can fully receive solar radiation. The ecopot having a large number of holes and hung in the space can prevent pathogens such as soil canikers known as pathogens against melon from invasion and, since it has good air permeability, oxygen, water and nutrients can be fed sufficiently. A graduated bucket for culture solution collection is placed below each ecopot and, by confirming the amount of excess culture solution drips and recovering the same, it is possible to adjust the feeding amount of the culture solution while estimating the optimum growth condition of the plant under cultivation. This cultivation method is used for cultivating melon, strawberry or the like using ecopots having a large number of holes and hung in the air, so that the whole plant in each pot is variable in position and can be freely moved according to the growth. As a result, it is no more necessary to maintain the painful half-sitting or bending forward working posture but the control operations can be performed in the standing position facing the plant under cultivation; thus, there are further advantages that the condition of growth of the crop plant can be observed and grasped sufficiently and that the workers are released from the half-sitting or bending forward posture and their physical sufferings are alleviated; this is good for their health.

The cultivation method of the present invention is excellent in workability and it is easy to transport or transfer, by means of a truck, the cultivation materials to another place where the environment is optimal.

DETAILED DESCRIPTION OF THE INVENTION

Owing to the use of an ecopot having a large number of air-permeable holes, oxygen, water and nutrients are abundantly fed to the rooting zone of a cultivated species and the plant under cultivation can be moved with ease in response to the direction and angle of the sunshine, so that the whole stem and leaves of the plant under cultivation can make the maximum use of the sunshine energy to thereby store sugars within the plant and convert them to amino acids and proteins and send them to sites requiring them; the fruit is thus enriched and the sugar accumulation therein is increased, hence the fruit becomes high-quality one. By placing a graduated bucket for culture solution collection below the ecopot, sounder control of melon or strawberry cultivation can be achieved by confirming the amount of the culture solution collected in the bucket. Further, by freely moving each plant body, it becomes possible to conduct operations efficiently in the standing position facing the plant or fruit.

Example 1

Figure 1:
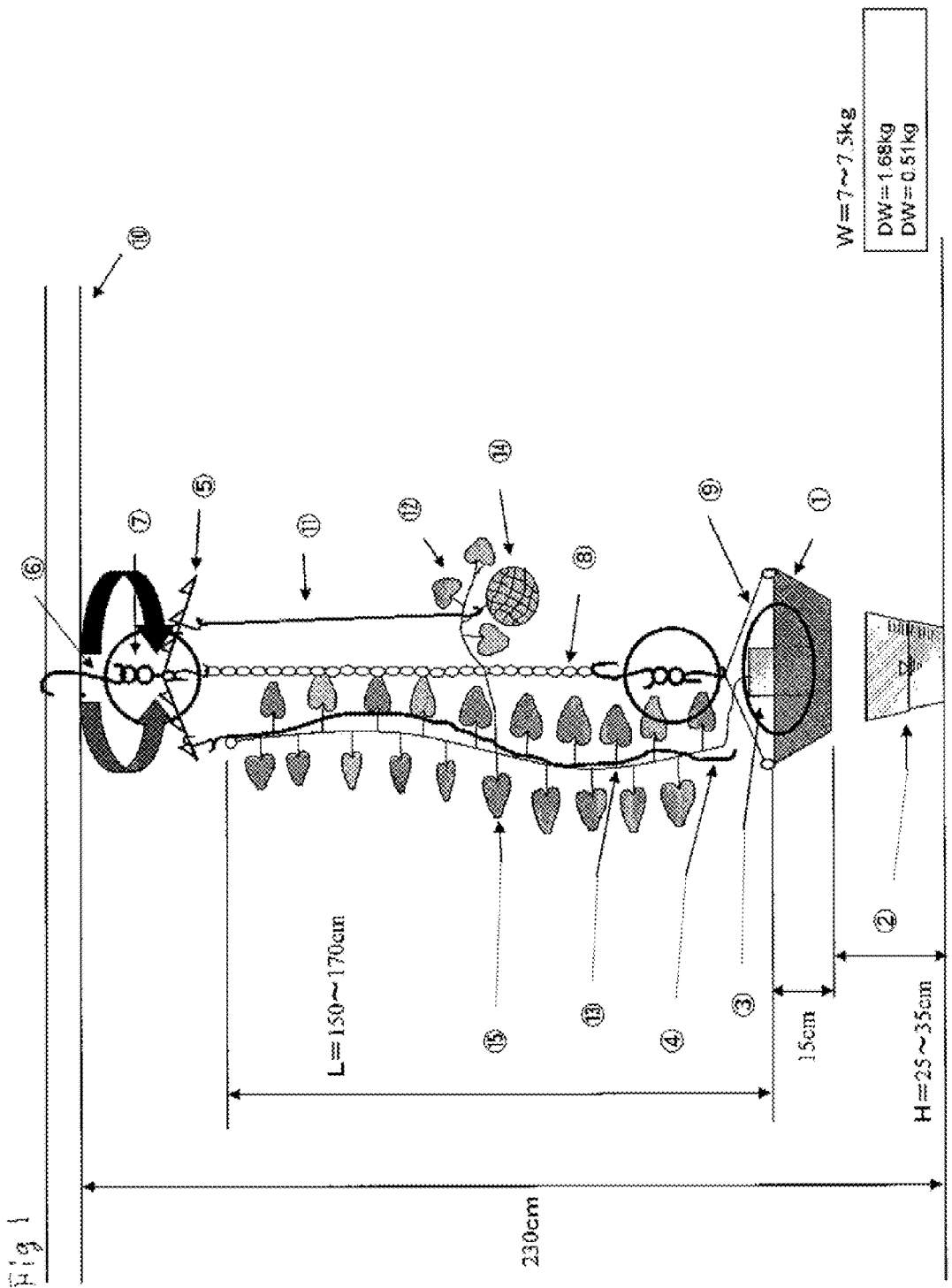
FIG. 1 is a schematic representation of a cultivation apparatus in which the cultivation method of a variable and efficient space utilization type is to be carried out; the figure indicates essential parts and the sizes thereof.
Figure 2:
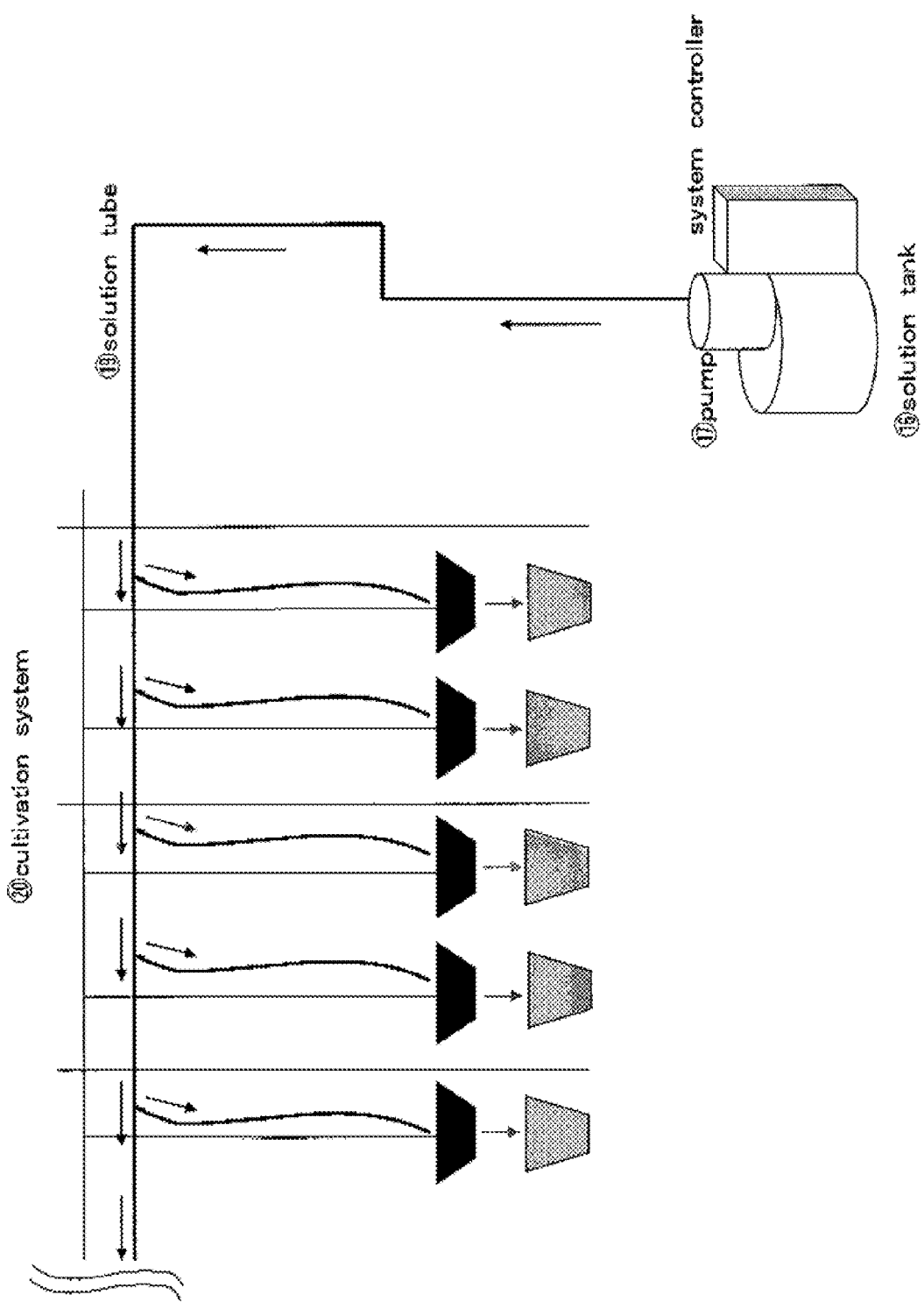
FIG. 2 illustrates a cultivation system according to one embodiment of the present invention.

FIGS. 1 and 2 illustrate a melon cultivation system 20 according to the variable and efficient space utilization type cultivation method according to the present invention, together with the sizes of the main elements of the melon cultivation system device. 1 indicates a cultivation medium and an ecopot, 2 a graduated bucket for receiving excess culture solution, 3 a seedling pot, 4 a main melon stem attracting cord, 5 a balancing toy-like hander, 6 a hook, 7 a loop clutch, 8 an ecopot hanging chain, 9 a pot supporting cord, 10 a shelf pole, 11 a melon fruit hanging cord, 12 a fruit bearing lateral shoot and lateral shoot leaf blades, 13 a main stem of melon, 14 a melon fruit around the 10th node of the main stem, and 15 a main stem leaf blade.

The cultivation ecopot 1 creates a good rooting zone environment excellent in air permeability owing to the use of the same material as the ecopot body. Oxygen, water and nutrients can be abundantly fed to the roots of the melon seedling growing in the seedling pot 3. A pipe 19 for feeding the culture solution in a cultivation system 20 is provided for the cultivation ecopot 1, an appropriate amount of the culture solution sent from a culture solution tank 16 by means of a pump 17 is dripped into the ecopot 1 at each appropriate occasion, and the residual solution is collected in the graduated bucket 2 placed therebelow, as shown in FIG. 2. The culture solution is dripped from time to time according to the state of growth and it is not necessary to always drip the same. Such materials for cultivation as the ecopot and seedling pot are made of a recyclable material and, when they become no longer needed, they are all finely ground, sterilized and disinfected with high-temperature steam (120-150° C.) and immersed in a culture solution for compost regeneration.

After melon seeding and seedling raising, the seedling pot 3 is set in the middle of the cultivation ecopot 1, four pot supporting cords 9 are tied to the ecopot 1, the hanging chain 8 is attached thereto via the same loop clutch as the loop clutch 7 for varying the orientation arbitrarily, and the balancing toy-like hanger 5, ecopot 1, attracting cord 4 and hanging cord 11 are all orientation-variable and are hung from the shelf pole 10 within the house. Further, the main melon stem 13, melon fruit 14 and main melon stem leaf blades 15 are respectively hung in a balanced manner according to the state of growth. The center of the balancing toy-like hanger is provided with the cord 4 attracting the melon main stem 13 in a twistable manner, making it possible for the hanging chain 8 and the melon fruit-hanging cord 11 to change their positions and rotate. The balance between the left and right arms of the hanger has a structure and space that enable adjustments even after growth of the melon vine to 150-170 centimeters according to the state of growth.

The explanatory drawing (FIG. 1) showing the apparatus for carrying out the present invention and the sizes of the main portions thereof schematically illustrates the method of melon cultivation. In FIG. 1, a height of about 190 centimeters is secured from the ground to the shelf pole 10 in the house, the hook 6 movable according to the growth of melon is hung from this shelf pole 10, one end of the balancing toy-like hanger 5 suspended from the shelf pole 10 is provided with the hanging chain 8 via the loop clutch 7 and the cultivation ecopot is hung by means of the supporting cords 9 so that the ecopot 1, about 15 centimeters in depth, may be positioned in a space at a height of 25-35 centimeters from the ground. The upper end of the ecopot hanging chain 8 is hung, via a hook, from the center of the balancing toy-like hanger 5. The upper end of the main melon stem attracting cord 4 is tied to one arm of the balancing toy-like hanger 5, the melon seedling pot 3 is set in the medium placed in the ecopot 1, and the main melon stem 13 is caused to be attracted by the attracting cord 4 successively according to the growth. The worker binds the main melon stem 13 and the upper end of the melon fruit hanging cord to the other arm of the balancing toy-like hanger 5 and operates the chain 8 according to the elongation and growth of the hung main melon stem so that the worker can take the standing position facing the main melon stem leaf blades 15. The device is thus designed so that the worker can take such working position.

Since the orientation of the ecopot 1 which is now can be hung with ease can be modified using the balancing toy-like hanger 5 attached to the pot hanging chain 8, the orientation of the pot can be arbitrarily changed toward the sun so that the plant may be efficiently exposed to the solar rays. The cultivation method, as a method of cultivating horticultural plants, makes it possible to operate the ground temperature and efficiently utilize the solar rays and, as a result, can achieve high yield levels and high-quality cultivation. It is an important element in high-quality melon production to achieve optimum temperature control and secure the optimum position for high levels of light intercepting efficiency. These requirements are fully satisfied by the variable and efficient space utilization type cultivation method proposed herein.

The present invention has been accomplished primarily for melon cultivation as described in Example 1. However, it is also best suited as a cultivation method not only for melon but also for horticultural plants such as strawberry. The method is expected to lead to high-quality products through excellent growth of main stems and leaves, good fruit shape and promotion of sugar accumulation in enriched sarcocarp. On the other hand, from the standpoint of ecosystem promotion, the cultivation materials used can all be finely ground, sterilized and disinfected and supplemented with a culture solution for reuse as compost. When charred rice husk, bamboo charcoal, bentonite, artificial zeolite and so forth are added in small amounts to the thus regenerated medium, good-quality cultivation medium materials newly having a buffer effect can be regenerated.

By using this novel cultivation method in protected horticulture, farm practices become markedly easier, namely they can be carried out in the standing and facing position, and high efficiency levels can be attained; thus, the workers can advantageously achieve cultivation control in a healthy way. In addition to these advantages, the present cultivation method can be easily introduced into greenhouses and can be expected to render cultivation control easier, reduce the operations and improve the work efficiency, making it possible to high-yield and high-quality production of horticultural crops with increased economic features; at the same time, further self-reliance of greenhouse farmers and a hopeful prospect for the future thereof can be viewed. It is hoped that the method makes it possible to provide a field of horticultural technology development to support greenhouse farmers.

The invention claimed is:

1. A cultivation method for variable and efficient space utilization, the method comprising
hanging a balancing hanger having a first arm and a second arm, from a first hook, the first hook hanging from and movable on a shelf pole via a loop clutch so that the orientation of the balancing hanger can be varied by reattaching the loop clutch,
hanging a second hook from the balancing hanger,
tying an upper end of a hanging chain to the second hook,
tying a main melon stem attracting cord to a third hook on the first arm of the balancing hanger,
tying a melon fruit hanging cord to a fourth hook on the second arm of the hanger, and
attaching pot supporting cords a cultivation ecopot having a plurality of holes, the pot supporting cords being suspended from a lower end of the hanging chain via a hook and a loop clutch so that a pot can move in a twisting manner upon reattaching the loop clutch,
wherein the first hook is disposed and the balance between the first and second arms of the balancing hanger can be adjusted, so as to provide an orientation-variable structure so that sunshine can be intercepted.

* * * * *